United States Patent Office 2,704,531
Patented Mar. 22, 1955

2,704,531

METHOD OF INCUBATING EGGS

Ralph K. Bailey, Springfield, Ohio, assignor to The Buckeye Incubator Company, Springfield, Ohio, a corporation of Ohio No Drawing. Application May 1, 1953,
Serial No. 352,569

3 Claims. (Cl. 119—1)

This invention relates to the incubation of eggs and more particularly to a novel method of increasing the yield of live chicks from a given setting of fertile eggs.

In the commercial incubation of eggs it is the general practice to set a considerable quantity of eggs in an incubating device having an enclosed space provided with suitable mechanism for regulating the temperature, humidity, and atmosphere surrounding the eggs. Such mechanism embodies suitable controls responsive to dry-bulb temperatures, wet-bulb temperature, or relative humidity fans for circulating the air, dampers for providing fresh air, means for periodically turning the eggs, safety controls, and the like, by means of which it is possible to produce and maintain predetermined desired temperature and humidity conditions to a close degree of accuracy.

The eggs may be placed in the incubator in a single stage or batch which will result in all of the eggs hatching at approximately the same time, or they may be placed in the incubator in stages, one stage for example representing a sixth of the batch being put in every three and one-half days in the case of chicken eggs, so that there will be a batch completed every three and one-half days with the incubator being in continuous operation. The eggs may be hatched in the same unit in which they are incubated, or they may be removed from that unit and placed in a separate hatcher for ease of handling, improved sanitation, etc.

Heretofore the practice has been to so regulate the controls that a predetermined substantially uniform condition of both temperature and humidity is maintained throughout the initial period of incubation. In the case of chicken eggs, this period extends over the first eighteen days, at the end of which time the embryo is well formed, and the air sack between the two membranes within the shell and the small end of the egg has likewise been well developed. At this time the embryo chick punctures through the inner membrane and thereafter breathes into the air sack, the oxygen needed by the chick and the carbon dioxide and water vapor given off by its metabolism being slowly diffused into the sack and from that through the outer membrane and the shell to the surrounding atmosphere. The added supply of oxygen thus obtained enables the chick to break the shell which it does by puncturing the same end at approximately the level of the air sack, and after an additional period of approximately three to three and one-half days, the chick breaks through and finally steps out of the shell. The above periods are those usually encountered with chickens, and while the periods vary somewhat for turkeys, ducks, and other poultry, essentially the same series of steps occurs, and the term "chicks" is used herein to apply all types of poultry.

There is always a loss of some of the chicks which are alive on the 18th day and which never hatch from the eggs. These figures vary but in some cases may run as high as 12 to 20 points. For example, assuming a setting of 10,000 eggs to be candled on the 9th day of incubation and found to contain 8,000 fertile eggs, a yield of 7,500 chicks is known as a 5 point spread. It is evident that the loss of chicks by failure to hatch where the chick was alive and hatchable at the end of the initial period of incubation represents a serious factor to the grower, and an incubation method which reliably brings about marked improvement in that loss has considerable importance.

When the incubation has progressed through the initial period, i. e., up to the 18th day in the case of chicken eggs, it is the practice to lower the temperature and simultaneously to increase the humidity to provide higher humidity conditions during the time the chicks are puncturing the shell and to facilitate the final break-through of the shell by the chick. Accordingly it has been the practice at this point in the incubation to change the atmosphere surrounding the eggs to produce such lower temperature and higher humidity where the eggs remain in the same unit, or in the case of the use of separate units, by placing the eggs in the hatching unit where such lower temperature and higher humidity conditions have been established.

In accordance with the present invention, a different procedure is followed at the end of the initial incubation period. While the theoretical basis for this new procedure is not fully understood, it is believed that the following will illustrate the procedure involved and a possible explanation of the effects thereof. When the eggs following the initial period of incubation are placed in an atmosphere which is cooler and more moist, they tend to chill and this is particularly true with regard to the end of the egg adjacent the air sack, which is subject to more rapid cooling than the main body of the egg. Because of the greater quantity of moisture in the air, as well as its lower dry-bulb temperature, the relative humidity is markedly increased, and there is a greater tendency for water vapor to condense upon and within the pores of the shell, or a lesser opportunity for water vapor to escape outwardly through the shell, especially at the cooler end thereof. A collection of water vapor within the pores of the shell effectively blocks the diffusion therethrough of the flow of oxygen into the sack and the escape of carbon dioxide outwardly therefrom, with the result that instead of facilitating the breathing of the chick at the critical period, its ability to breathe is hampered to the extent that the pores are choked. According to the invention, therefore, such controls are provided as to avoid such tendency, and particularly, no moisture is added during the initial interval following the lowering of the temperature, so that there is much less likelihood of the pores being choked. Moisture is restored either immediately or over a period of time, and the proper higher humidity condition is established to aid the chick in finally breaking through the shell. Where the relative humidity is gradually raised there is further assurance that the pores in the shell will retain their normal diffusing function.

The following are typical examples showing the method of practicing the invention. In a typical example of the hatching of chicken eggs, the eggs are maintained at a dry-bulb temperature of 99½° F. and a wet-bulb temperature of 86° F., corresponding to a relative humidity of 57% at a barometric pressure of 29 inches of mercury, these conditions continuing from the first through the 18th day of incubation. Thereafter the conditions of the atmosphere are changed by reducing the dry-bulb temperature to 97°, this being in accord with the conventional practice in this respect. However instead of adding additional moisture to the atmosphere as has been customary in the conventional methods to bring the wet-bulb temperature up to approximately 87% corresponding to a relative humidity of 67%, no moisture is immediately supplied and the wet-bulb temperature and relative humidity are both substantially reduced. In a single unit incubating equipment the continued circulation and ventilation of the atmosphere without further addition of moisture results in a marked reduction in moisture content of the air to a wet-bulb reading for example of 80°, corresponding to a relative humidity of 47%. In the case of a separate hatching unit, it has been found satisfactory to establish the dry-bulb temperature at 97° and without addition of moisture thereto the wet-bulb temperature may also be of the order of 80°, corresponding to the ambient condition therein.

Such lower relative humidity condition is maintained for a limited time such as from four to six hours, it being found that within that period, and after the eggs have reached the lower temperature, the tendency for the occurrence of objectionable water vapor within the pores of the shell such as to block off the diffusion of gases therethrough is substantially reduced. Thereafter, while the dry-bulb temperature remains the same, moisture is added to the atmosphere until the relative humidity has been restored and preferably raised to a somewhat higher value than that during the initial period. This procedure may be carried out at once but under certain conditions it preferably extends over a longer interval such as approximately twelve to eighteen hours, resulting in raising of the wet-bulb temperature to approximately 87° while the dry-bulb temperature remains at 97°, corresponding to a relative humidity of 67%. These conditions are then maintained from the 19th through the 21st day, at which time the chicks are fully hatched.

It will be understood that the particular time intervals are given as illustrative and may be varied with different conditions and with different types of eggs. For example in the case of turkey eggs, the initial incubation period is 25 days during which time the dry-bulb temperature is held at 99.3° and the wet-bulb at 84°, corresponding to a relative humidity of 52%, at a barometric pressure of 29 inches of mercury. The conditions are then changed to a dry-bulb of about 97° and a wet-bulb of about 80°, for example, a R. H. of 47%, which conditions are maintained for about four to six hours. Thereafter moisture is added to bring the wet-bulb to about 87° or 89°, a R. H. of 67% and 73% respectively, and maintained at that value for the remaining three to three and one-half days of the hatching period. Favorable results have been secured from the practicing of such process with the point spread in some cases being reduced from approximately 14 to 18 down to 10 or even less, such increase in the yield of live chicks having substantial value to the grower.

While the method herein described constitutes a preferred embodiment of the invention, it is to be understood that the invention is not limited to this precise method, and that changes may be made therein without departing from the scope of the invention which is defined in the appended claims.

What is claimed is:
1. The method of incubating eggs in a surrounding atmosphere which comprises controlling the temperature and humidity of said surrounding atmosphere throughout the initial period of incubation and until the embryo and the air sack at the end of the egg are well formed, thereafter transferring said eggs and establishing a hatching atmosphere at a lower temperature and a lower relative humidity for a limited but substantial period of time after the eggs are transferred to allow the eggs to reach equilibrium conditions, and thereafter increasing the humidity while maintaining said lower temperature until the eggs are hatched.

2. The method of incubating eggs in a surrounding atmosphere which comprises maintaining substantially uniform conditions of temperature and humidity of said atmosphere throughout the initial period of incubation and until the embryo and the air sack at the end of the egg are well formed, thereafter establishing a hatching atmosphere around said eggs at a lower temperature and a lower relative humidity for a limited but substantial period of time to allow the eggs to reach equilibrium conditions therein, and thereafter increasing the humidity of said hatching atmosphere while maintaining said lower temperature until the eggs are hatched.

3. The method of incubating eggs which comprises placing the eggs in a setting atmosphere, controlling the temperature and humidity of said atmosphere throughout the initial period of incubation and until the embryo and the air sack at the end of the egg are well formed by adding moisture to said atmosphere during said initial period as required to maintain a predetermined humidity condition therein favorable to incubation and by regulating the amount of heat to maintain a predetermined substantially uniform temperature throughout said period favorable to incubation, thereafter removing the eggs from said setting atmosphere and transferring said eggs to a hatching atmosphere, maintaining said hatching atmosphere at a lower temperature and at a lower relative humidity than said setting atmosphere for a limited but substantial period of time after the eggs are placed therein to allow the eggs to reach equilibrium conditions in said hatching atmosphere, and thereafter increasing the humidity of said hatching atmosphere while maintaining said lower temperature therein until the eggs are hatched to produce a higher moisture content in said hatching atmosphere favorable to hatching.

References Cited in the file of this patent

"Incubation at High Altitudes," appearing in the May 1952, issue of Poultry Science, vol. 31, No. 3, pages 497 through 509.